US009182656B2

United States Patent
Langley et al.

(10) Patent No.: US 9,182,656 B2
(45) Date of Patent: Nov. 10, 2015

(54) OPTICAL MASK FOR BLENDING OVERLAPPING TILED IMAGES

(75) Inventors: Jack Langley, Portslade (GB); Martin Howe, Haywards Heath (GB); Craig Maddock, Burgess Hill (GB); Nicholas Richard Coates, Southampton (GB)

(73) Assignee: ELECTROSONIC LIMITED, Dartford, Kent (GB)

( * ) Notice: Subject to any disclaimer, the term of this patent is extended or adjusted under 35 U.S.C. 154(b) by 242 days.

(21) Appl. No.: 13/992,949

(22) PCT Filed: Dec. 9, 2011

(86) PCT No.: PCT/EP2011/072370
§ 371 (c)(1),
(2), (4) Date: Dec. 23, 2013

(87) PCT Pub. No.: WO2012/076706
PCT Pub. Date: Jun. 14, 2012

(65) Prior Publication Data
US 2014/0098348 A1 Apr. 10, 2014

(30) Foreign Application Priority Data

Dec. 10, 2010 (GB) .................................. 1020998.9

(51) Int. Cl.
*G03B 21/26* (2006.01)
*G03B 21/14* (2006.01)
(Continued)

(52) U.S. Cl.
CPC ................ *G03B 21/142* (2013.01); *G02B 5/00* (2013.01); *G02B 5/005* (2013.01); *G03B 21/13* (2013.01); *G03B 37/04* (2013.01); *H04N 9/3147* (2013.01); *G02B 27/1066* (2013.01)

(58) Field of Classification Search
CPC ...... G03B 1/142; G03B 21/142; G03B 21/13; G02B 5/00; G02B 5/005
USPC .............. 353/94, 97, 119; 348/383, 743–747, 348/778, 785
See application file for complete search history.

(56) References Cited

U.S. PATENT DOCUMENTS 2,610,544 A  12/1947 Waller et al.
4,505,558 A   3/1985 Albers et al.
(Continued)

FOREIGN PATENT DOCUMENTS

CA  2227920 A1  7/1999
FR  2774481     8/1999
(Continued)

OTHER PUBLICATIONS

International Search Report for PCT/EP2011/072370 dated Apr. 16, 2012.

*Primary Examiner* — Sultan Chowdhury
(74) *Attorney, Agent, or Firm* — Heslin Rothenberg Farley & Mesiti P.C.

(57) ABSTRACT

The invention provides an optical mask (1) for use in blending overlapping tiled images, the optical mask comprising a base (2); an array of elongate sliding elements (10) arranged side by side on the support, each sliding element being independently slidable along an axis and being constrained against lateral translational movement; the mask having a transmission-modifying edge (22) for positioning in a beam of light to modify transmission of the light, the transmission-modifying edge (22) having a profile which is adjustable by moving one or more of the sliding elements (10) along their axes.

20 Claims, 11 Drawing Sheets

(51) Int. Cl.
*G02B 5/00* (2006.01)
*G03B 21/13* (2006.01)
*G03B 37/04* (2006.01)
*H04N 9/31* (2006.01)
*G02B 27/10* (2006.01)

(56) References Cited

U.S. PATENT DOCUMENTS

| | | | |
|---|---|---|---|
| 5,597,222 | A | 1/1997 | Doany et al. |
| 6,017,123 | A | 1/2000 | Bleha et al. |
| 6,362,797 | B1 | 3/2002 | Dehmlow |
| 6,513,938 | B2 | 2/2003 | Kubota et al. |
| 6,619,804 | B2 | 9/2003 | Davis et al. |
| 6,760,075 | B2 | 7/2004 | Mayer, III et al. |
| 7,296,902 | B2 | 11/2007 | Gilbert et al. |
| 7,443,364 | B2 | 10/2008 | Damera-Venkata et al. |
| 2001/0022651 | A1 | 9/2001 | Kubota et al. |
| 2002/0054275 | A1 | 5/2002 | Yamanaka |
| 2003/0156262 | A1 | 8/2003 | Baker et al. |
| 2004/0201826 | A1 | 10/2004 | Nishida et al. |
| 2005/0083492 | A1 | 4/2005 | Taubenberger |
| 2008/0259223 | A1* | 10/2008 | Read et al. .................. 348/745 |
| 2009/0213337 | A1* | 8/2009 | Kondo et al. ................. 353/31 |

FOREIGN PATENT DOCUMENTS

| | | |
|---|---|---|
| GB | 2352836 A | 2/2001 |
| WO | 0141455 A1 | 6/2001 |

* cited by examiner

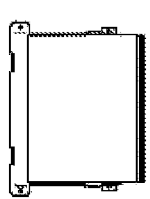
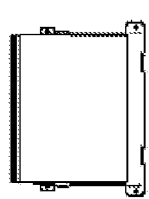
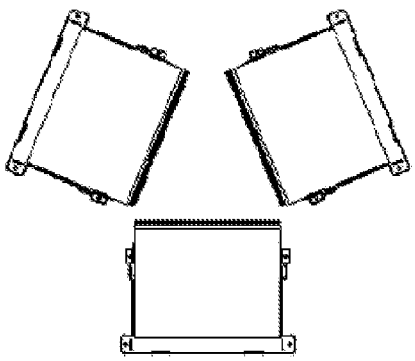
Figure 13
Figure 14
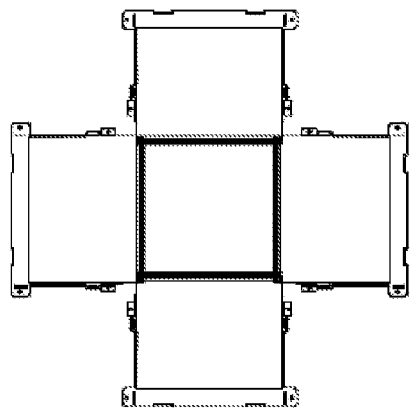
Figure 15

OPTICAL MASK FOR BLENDING OVERLAPPING TILED IMAGES

CROSS REFERENCE TO RELATED APPLICATIONS

This application is a national stage filing under section 371 of International Application No. PCT/EP2011/072370, filed on Dec. 9, 2011, and published in English on Jun. 14, 2012, as WO/2012/076706, and claims priority to British Application No. 1020998.9 filed on Dec. 10, 2010. The entire disclosures of each of the prior applications are hereby incorporated herein by reference.

This invention relates to an optical mask for use in blending images from multiple projectors, to projection apparatus including the masks and to optical methods of blending two or more images to form a larger image.

BACKGROUND OF THE INVENTION

Producing a large image over a large field-of-view generally requires more image data and light output than can be provided by a single projector. Consequently, it has long been standard practice to use multiple projectors to form large scale composite images.

A problem facing designers of multiple projector systems is how to ensure that the composite image appears as a single continuous image and not as a mosaic. There are essentially two main methods of forming a composite image, namely edge-matching and overlapping. Edge-matching involves masking the image to form an image with a hard-edged shape. The hard-edged image is then abutted to an adjoining image. However, it has proved very difficult in practice to achieve an unobtrusive join between adjacent images, particularly when the projection surface is double curved such that the shapes of each projected image are non-orthogonal. Frequently edged-matched composite images contain some bright areas of overlap and/or other dark areas with no image. Mainly for these reasons, edge-matched techniques have been largely abandoned in recent years and have been superseded by overlapping image methods in which adjoining images are deliberately overlapped by an area equal to about 10 to 25% of the width of the image. The brightness of each sub-image is then made to taper off throughout the overlap region so that the sum of the brightness of the overlapping images is nearly constant.

Overlapping image tiling methods are well established but there have nevertheless been many problems with such methods. A particular problem has been in the controlling the uniformity of the image across the overlap regions. When the projectors are set to dark field there is still some residual light output. In the overlap regions this unwanted illumination is provided by more than one projector so the corresponding dark field light level is multiplied. Uniformity can be restored by increasing the light levels in other areas of the image but this has the disadvantage of reducing the contrast of the image.

Optical shadow masks have therefore been used to suppress black levels in the overlap region. The masks can either be manufactured in a fixed configuration or they can be designed to be adjustable so that the necessary profile can be imparted to the mask during installation. A problem with manufacturing the masks in a fixed configuration is that once installed, the masks cannot thereafter be adjusted to compensate for any movement in the projection surface or projection equipment. In particular, if the initial measurements used as the basis for the manufacture of the masks are insufficiently accurate, or there is movement in the surface onto which the images are to be projected, or if the projection surfaces are uneven or are of variable curvature, the resulting mask may give very poor results.

A preferred approach is therefore to manufacture an adjustable curve which is then calibrated in situ. This approach requires the mask to be made from a material which is flexible enough to be formed into the correct shape, but is thereafter stable enough to maintain that shape. Previous approaches have made use of flexible materials including polymers and polymer foams but these materials are known to exhibit creep when left under load for protracted periods. In addition they are typically subject to expansion and contraction as a consequence of thermal cycling due to heat from the projector and diurnal effects. A further problem is that some installations are vulnerable to interference by customers or other personnel who may inadvertently dislodge the masks.

Canadian patent application CA 2227920 (Chun-shan Institute of Science and Technology) discloses a projection system making use of multiple projectors in which a frame holding a plurality of sharp-edged sliders is mounted in front of each projector lens. Diffraction of light at the sharp edges of the sliders is said to enable the brightness of overlapping images from adjacent projectors to be adjusted in order to improve overall picture quality. However, the device disclosed in CA 2227920 would appear to suffer from a number of disadvantages and is unlikely to be suitable for use with modern digital projection apparatus. Because the sharp edges are integrally formed with the sliders, they are of necessity somewhat large. As a consequence, the rather coarse profile created by the sharp edges will provide only a very crude means for adjusting brightness levels in the areas of overlap between adjacent images. Furthermore, the arrangement of the sliders in the Chun-shan device would most cause shadowing and light leakage between the sliders, leading to further loss of resolution of the images in the area of overlap. A further drawback to the device disclosed in CA 2227920 is that, so far as it is possible to tell, the device is only capable of manual adjustment and the arrangement of the frame and sliders does not readily lend itself to automation.

SUMMARY OF THE INVENTION

Thus, there remains a need for an image blending system which can be used to blend overlapping images from a plurality of projectors such that a single continuous image is created and the joins between the images are not visible to the naked eye, and where the system can be adjusted readily to compensate for irregularities in the curvature of the projection surface and post-installation movement of the components of the projection system.

The present invention addresses the aforementioned problems by the use of an adjustable mask having a profile that can be calibrated in situ on installation but which can thereafter be recalibrated either manually or remotely to compensate for changes to the system.

Accordingly, in a first aspect, the invention provides an optical mask for use in blending overlapping tiled images, the optical mask comprising a support; an array of elongate sliding elements arranged side by side on the support, each sliding element being independently movable along an axis and being constrained against lateral translational movement; the mask having a transmission-modifying edge for positioning in a beam of light to modify transmission of the light, the transmission-modifying edge having a profile which is adjustable by moving one or more of the sliding elements along their axes.

The term "edge" as used herein includes within its ambit both continuous edges and composite edges formed from a plurality of adjoining edges.

The transmission-modifying edge is formed separately from the elongate sliding elements and is then attached to the sliding elements, either directly or indirectly, in such a way that movement of the sliding elements results in movement of the transmission-modifying edge.

Because the transmission modifying edge is formed separately from the elongate sliding elements, the edge can be constructed in such a way that it provides a much smoother profile than is possible with, for example, the device disclosed in CA 2227920, As a result, the mask of the present invention enables much more precise control over the blending of overlapping images.

In one embodiment, the transmission-modifying edge is a composite edge formed from a plurality of adjoining edges. In one particular embodiment, the composite edge comprises a row of edge-forming elements, the row extending transversely with respect to the elongate sliding elements. Typically, the row of edge-forming elements is disposed across one end of the array.

In another embodiment, the transmission-modifying edge is a continuous edge.

According to the invention, the mask is positioned in a beam of light from a projector so that it obscures part of the area of overlap between an image from the projector and an adjacent image from another projector. The position of the mask and its profile can be altered to control the intensity of light falling on the overlap area thereby enabling the adjacent overlapping tiled images to be blended together.

The profile of the transmission-modifying edge can be adjusted by moving the elongate sliding elements (which may be referred to hereinafter for convenience as "profile formers") forwards or backwards along their axes. For example, when the transmission-modifying edge comprises a row of edge-forming elements, the elongate sliding elements are connected, either directly or through an intermediate movement-transmitting element, to the edge-forming elements and therefore movement of the elongate sliding elements results in movement of the edge-forming elements.

In one embodiment, the transmission-modifying edge is connected directly to the elongate sliding elements without any movement-transmitting element there between. In this embodiment, each elongate element may, for example, carry 1, 2 or 3 edge-forming elements. In one particular embodiment, each elongate element carries a single edge-forming element.

The transmission-modifying edge may be made separately from the elongate sliding elements and then attached thereto, for example by adhesive bonding.

In another embodiment of the invention, the transmission-modifying edge is a singular continuous element. The edge is formed from a material that is sufficiently flexible to move in response to pressure from the elongate sliding elements but is sufficiently stiff that the transmission modifying element retains its shape. The edge can be, for example, formed from a thin metal material.

Where the transmission-modifying edge is not joined directly to the elongate sliding elements, it is preferred that a resiliently deformable movement-transmitting element is positioned between the elongate sliding elements and the transmission-modifying edge. The movement-transmitting element serves in use to transmit movement of the elongate sliding elements to the transmission-modifying edge. The edge is preferably fixed to the movement-transmitting element, for example by adhesive bonding. Typically, the movement-transmitting element is formed from an elastomeric material. Examples of suitable elastomeric materials include natural or synthetic rubber materials, for example rubber-based elastomers such as ethylene propylene diene monomer (EPDM) rubber, polychloroprene (Neoprene$^{RTM}$) and composites thereof, as well as silicone-based elastomers such as heat-stabilised silicone rubber and high temperature silicone rubbers.

In order that the movement-transmitting element can convey both forward and backwards movement of the elongate sliding elements to the transmission-modifying edge, the elongate sliding elements are typically attached to the movement-transmitting element. They may be permanently or semi-permanently attached or removably attached. Thus, for example, they may be glued, welded, solvent welded or mechanically attached to the movement-transmitting element. In one embodiment, the elongate sliding elements have enlarged end portions that are held captive within an open ended channel extending along the length of the movement-transmitting element, the enlarged end portions being insertable into the channel and releasable therefrom by sliding them along the channel.

In order to prevent light incident on the mask from passing between the elongate sliding elements, it is preferred that the elongate sliding elements overlap in a lateral direction. More preferably, adjacent elongate sliding elements overlap by means of interlocking formations on mutually abutting sides thereof. For example, the elongate sliding elements may have tongue and groove interlocking formations. In one embodiment, the tongue may have an enlarged tip portion and the groove may have a restricted opening so that the tongue is held captive in the groove. An example of this type of overlap is a dovetail overlap.

Each elongate element is independently slidable along an axis and is constrained against lateral translational movement. The sliding elements may be restrained from lateral translational movement by means of a retaining wall or row of retaining elements either side of the array. In an alternative embodiment, each elongate element may have a recess (e.g. groove) or one or more protrusions (e.g. a tongue or ridge) on its underside that engages slidably with one or more protrusions (e.g. a tongue) or a recess (e.g. a groove) on the base.

Preferably, therefore, each elongate element is constrained to slide along a single axis.

Preferably, adjacent pairs of sliding elements are provided with movement limiting means which limit the distance that one sliding element can slide with respect to the other. More preferably, each of the sliding elements is provided with a movement limiting means to limit the distance that the sliding element can slide with respect to its adjacent sliding element. For example, the movement limiting means may be constructed so that the distance that a sliding element can slide with respect to its adjacent sliding element or elements is up to 6 mm, more usually up to 5 mm, for example 1-4 mm or 2-3 mm.

With known optical masks involving movable elements, a problem has been that the elements can be knocked and inadvertently dislodged thereby necessitating a visit from an engineer or technician to recalibrate the mask. In order to avoid this problem, the optical mask of the present invention may be provided with means for locking the elongate sliding elements against unwanted movement. Preferably the locking means are releasable. In one embodiment, the locking means comprises a clamping bar for clamping against the elongate sliding elements.

The optical mask of the invention comprises a support upon which the elongate sliding elements are mounted. The support may take the form of a flat plate upon which the elongate sliding elements are mounted. The support (e.g. plate) may be made from a plastics material or a metal and preferably is made from a metal material.

The optical mask of the invention can be adjusted manually by moving each of the elongate sliding elements by hand. Preferably, however, the mask comprises an actuator device for moving the elongate sliding elements along their axes. By using an actuator device, which can be controlled remotely, the optical mask can be adjusted by an engineer located at an optimal viewing position in an auditorium remote from the projector. Alternatively, the optical mask can be adjusted using a remote connection by an engineer working off-site. The remote connection provides a means for configuring the mask remotely and preferably also a means (e.g. a video link) for viewing the display within the auditorium so that the remotely located engineer can view the effect on a displayed image of changes in the configuration of the optical mask.

The actuator can be an electronic, electromechanical or mechanical actuator and preferably is an electromechanical actuator device.

In one embodiment, the actuator device comprises a first motor-driven carriage movable transversely with respect to the array of elongate sliding elements; a second motor-driven carriage linked to the first motor-driven carriage and movable axially with respect to the elongate sliding elements, the second carriage being provided with means for engaging the elongate sliding elements and moving them in an axial direction; and a controller for controlling the transverse and axial movements of the carriages.

The first and second motor-driven carriages are preferably arranged to move in mutually perpendicular directions. Thus, the first and second carriages may take the form of an x-y carriage system in which a track or guide rail for the y-carriage and the motor for the y-carriage are mounted on the x-carriage.

The means for engaging the elongate sliding elements is preferably configured so as to be able to move each elongate element individually.

The second motor-driven carriage (e.g. the y-carriage) typically is provided with a driving member (preferably a wheel) which engages a surface e.g. the surface of a protrusion or recess, on the elongate element. In one embodiment, each of the elongate sliding elements has a recess at or near one end thereof (typically the end remote from the edge), the recesses of the elongate sliding elements in the array collectively forming a channel along which the second motor-driven carriage may travel. In this embodiment, the second carriage may be moved along the channel to a desired location and the first motor-driven carriage activated to move the driving member forwards against the leading wall of the channel (thereby pushing the elongate element forwards) or backwards against the trailing wall of the channel (thereby pushing the elongate element backwards).

The optical masks of the invention are typically mounted on a mounting structure so that they can be mounted at a required location in, on or next to a projector. Whereas they can be mounted inside the housing of a projector itself, it is preferred that they are located outside of the projector housing. In one preferred embodiment, the mounting structure is provided with means for mounting the optical mask on a projector.

The optical masks are typically used in pairs or other multiples, for example multiples of two. Accordingly, in another embodiment, the invention provides an optical mask assembly comprising two or more optical masks as defined herein mounted on a mounting structure. In particular embodiments, the optical mask assembly comprises one, two, three, four or five optical masks, more typically two, three or four optical masks.

The mounting structure is typically provided with means for varying the position of one or more optical masks on the supporting structure. The means for varying the position of the optical mask may take the form of, for example, one or more slots or holes on one component (e.g. the supporting structure) which engage lugs or mounting bolts or screws on the other component (e.g. the optical mask). The means for varying the position of the optical mask may allow for translational movement of the mask on the mounting structure, or rotational movement, or a combination of translational and rotational movement.

The optical masks of the invention are particularly suitable for use with digital projection systems such as DLP (digital light processing), laser, LCOS (liquid crystal on silicon) and LED-based projection systems.

The invention further provides a projector having attached thereto one or more optical masks as defined herein or an optical mask assembly as defined herein.

The invention also provides a light projection system comprising one or more projectors and one or more optical mask assemblies as defined herein.

The light projection system typically comprises an electronic controller (e.g. computer) linked to each projector and optionally linked to each optical mask assembly.

The controller may be provided with a memory within which are stored x-y coordinates for each of the sliding elements in a mask for a particular profile. After installation, if the sliding elements are displaced from their correct alignment, they can readily be restored, e.g. by remote control of an electronic or electromechanical actuator forming part of the optical mask.

The invention further provides a method of blending overlapping images from a plurality of projectors, which method comprises placing in a light beam formed by each projector an optical mask as defined herein and adjusting the profiles of the transmission-modifying elements to control the amount of light transmitted past the transmission-modifying elements and onto a region of overlap between the overlapping images.

BRIEF DESCRIPTION OF THE DRAWINGS

FIGS. 13, 14 and 15 are schematic representations of different arrangements of optical masks. The supporting structures of the optical mask assemblies are omitted in each case for clarity in these Figures.

DETAILED DESCRIPTION OF THE INVENTION

Figure 1:
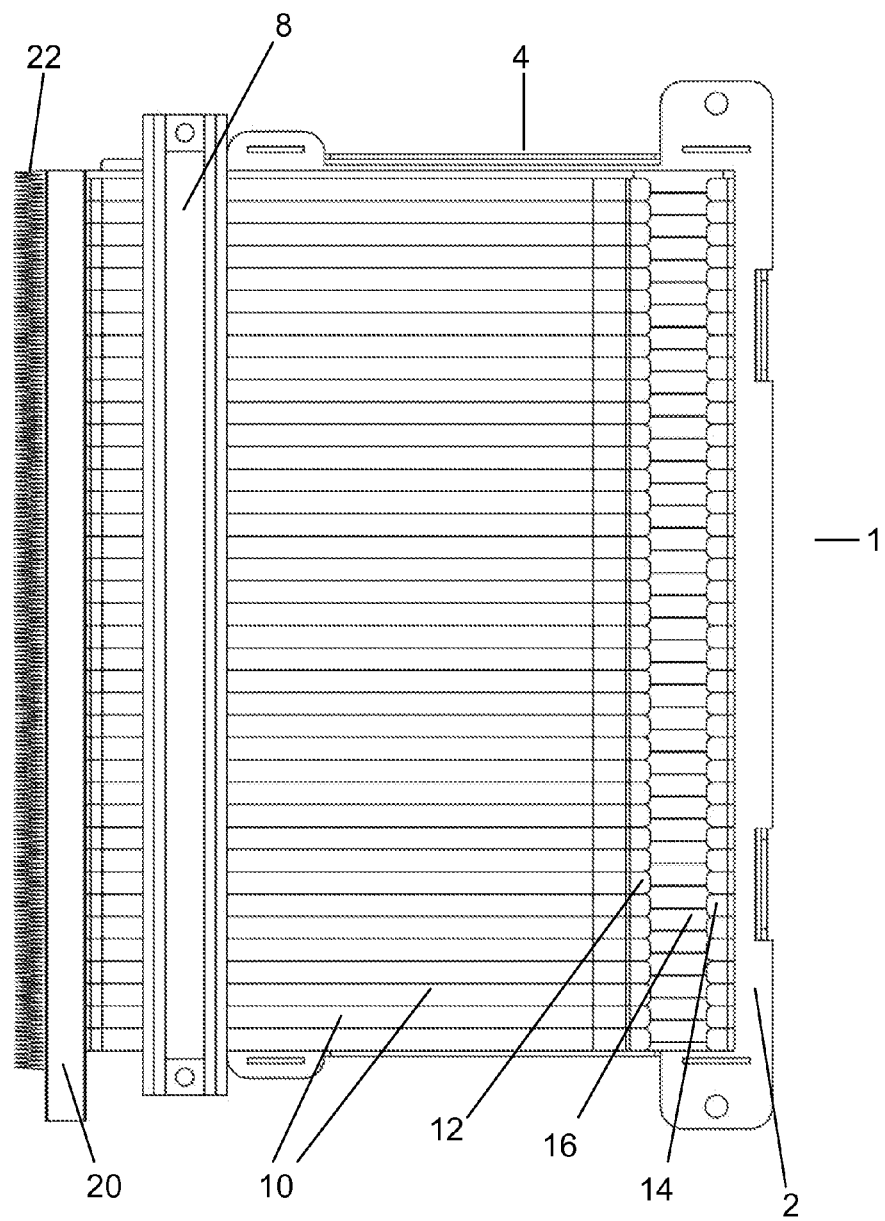
FIG. 1 is a view from one side of an optical blending mask according to one embodiment of the invention.
Figure 2:
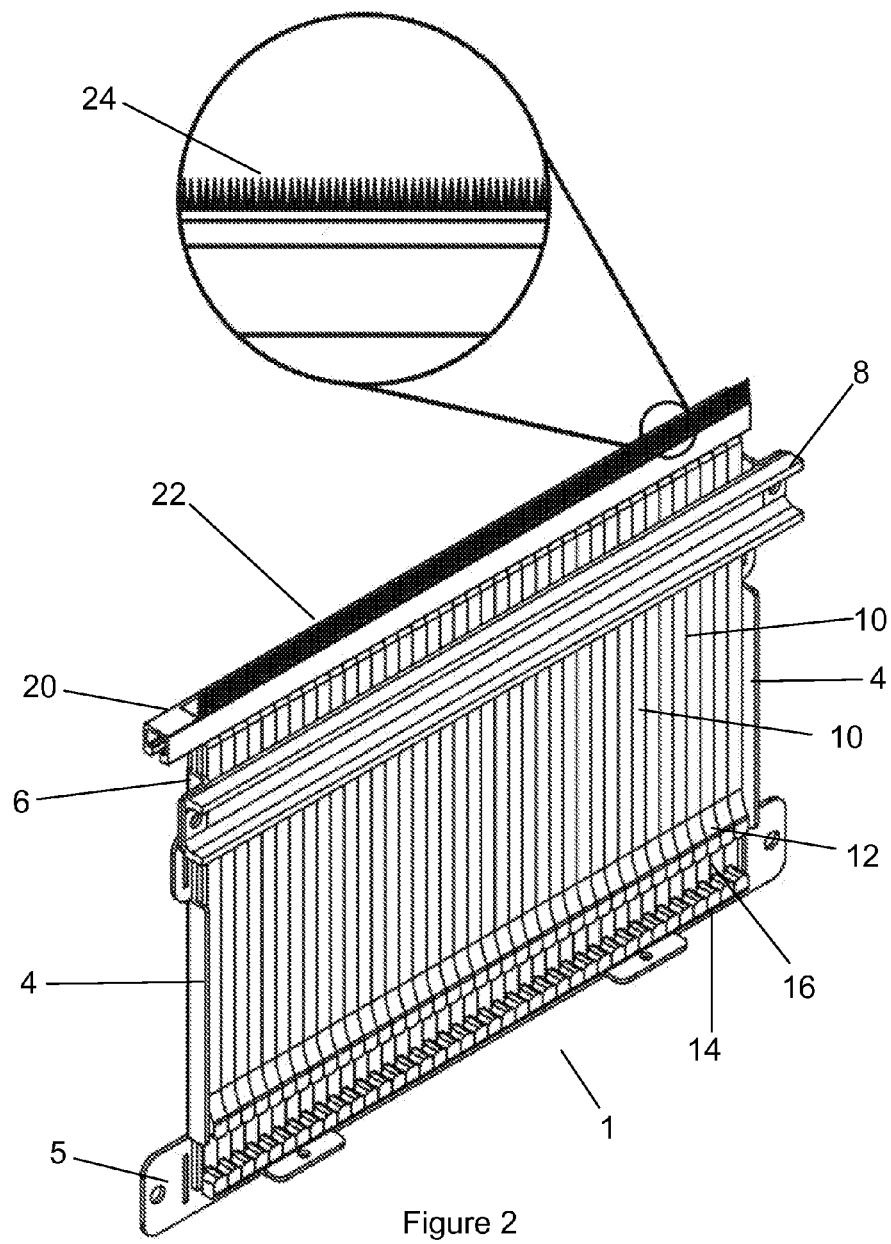
FIG. 2 is an isometric view of the optical mask of FIG. 1.
Figure 3:
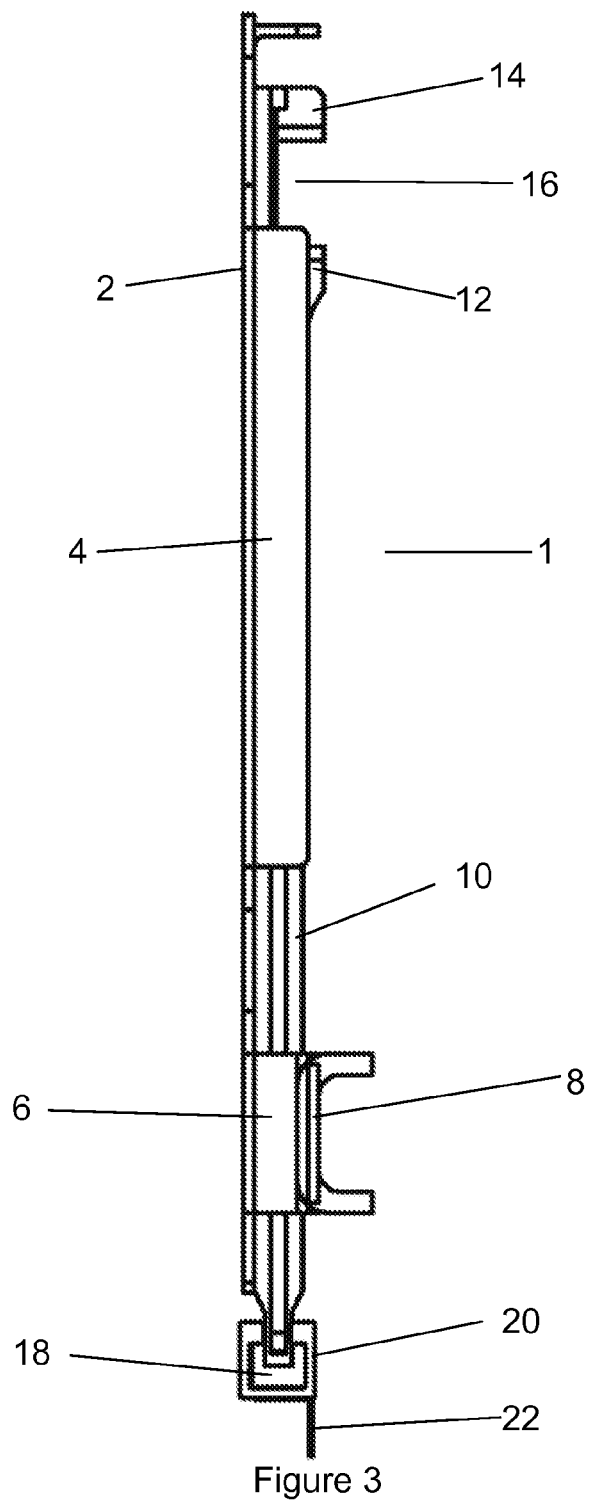
FIG. 3 is an end view of the optical mask of FIGS. 1 and 2.
Figure 4:
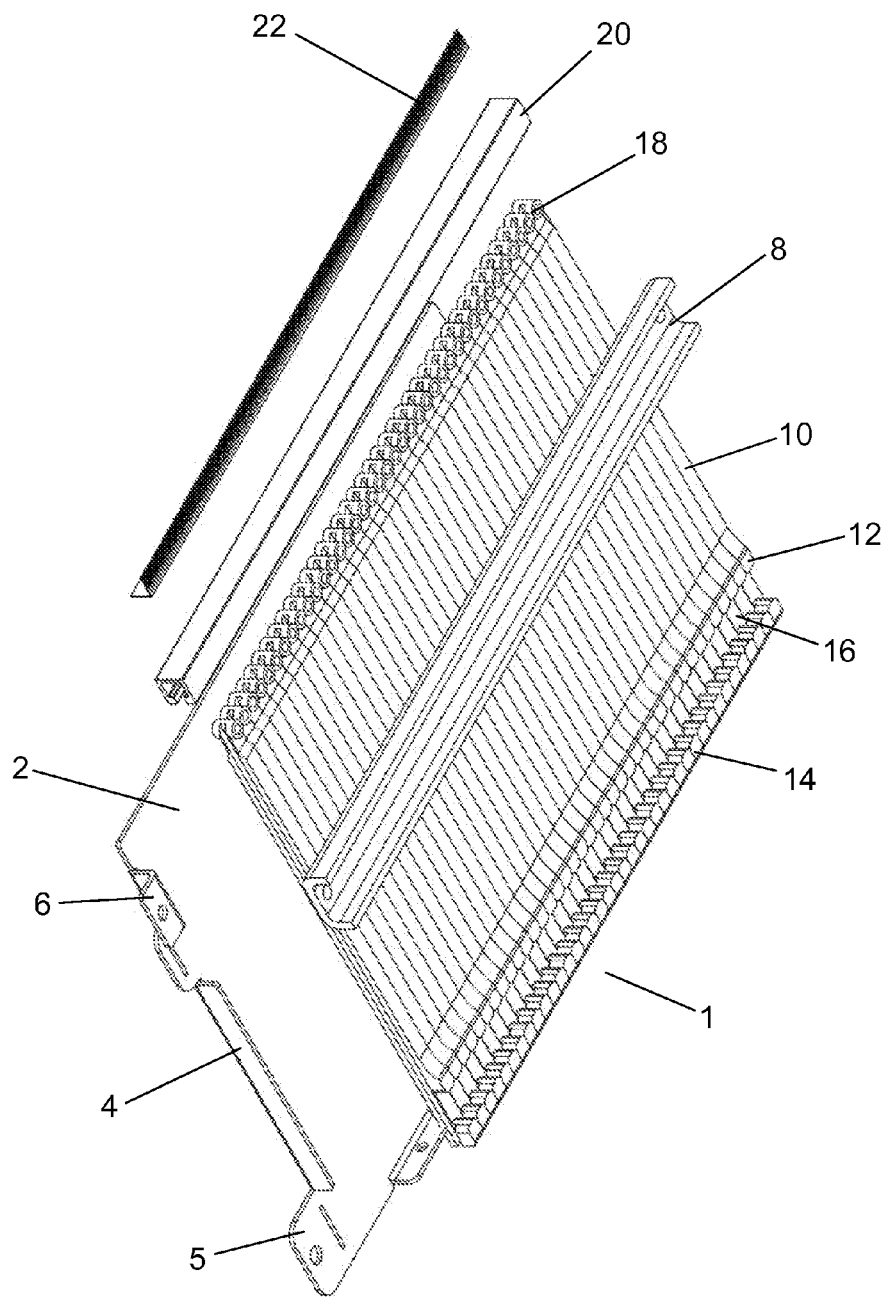
FIG. 4 is an exploded view of the optical mask of FIGS. 1 to 3.

The invention will now be illustrated, but not limited, by reference to the specific embodiments illustrated in the drawings FIGS. 1 to 16.

FIGS. 1 to 4 illustrate an optical blending mask according to a first embodiment of the invention. The optical blending mask comprises a support in the form of a base plate 2 which can be made from, for example, stainless steel. The base plate has a pair of upturned retaining walls 4 and a pair of upstanding brackets 6. A retaining bar 8 is secured to the upstanding brackets 6 by fastening elements (not shown) such as screws.

Mounted on the base plate 2, and held in place by the retaining walls 4 and the retaining bar 8, is an array of interlocked independently slidable elongate sliding elements 10 (hereinafter referred to for convenience as profile formers). The profile formers are typically made from a plastics material such as glass filled polyphenylene sulphide, although they could be formed from other plastics materials or even metals, provided that they have sufficiently low friction surfaces to enable the elongate elements to slide over one another and have appropriate working temperatures (e.g. above 50° C.). The manner in which the profile formers interlock is illustrated in the embodiment of FIGS. 5 and 6 and described in more detail below.

Each of the profile formers 10 has at one end thereof a pair of spaced apart wall formations 12, 14, the recessed regions 16 between the wall formations of the profile formers 10 collectively forming a shallow channel along which a motorised driving member (not shown) may be moved to alter the positions of the profile formers 10.

At the other end of each profile former 10 is an enlarged end portion 18 which, in this embodiment, is of generally cylindrical cross section. The enlarged end portion may be formed integrally with the profile former 10 or formed separately and then secured in place on the end of the profile former.

Attached to, and linking the ends of, the profile formers 10 is a channel-section moulding 20 of a deformable material such as a silicone polymer. The channel section moulding 20 (hereinafter referred to as the profile substrate) has a T-shaped channel which accommodates the enlarged end portions 18 of the profile formers 10 thereby securing the profile substrate 20 to the array of profile formers 10.

A transmission-modifying element 22 which, in this embodiment, has a comb profile, is attached to the profile substrate 20, for example by means of adhesive.

The profile formers 10 are independently slidable. Movement of a given profile former along its axis (the x-axis) will result in corresponding movement of the adjacent region of the profile substrate 20, which in turn will result in movement of the adjacent edge-forming elements 24 on the comb 22. Because the profile substrate 20 and comb 22 are both formed from deformable materials, the profile of the comb 22 can be altered in a very sensitive manner by sliding the profile formers in and out.

Figure 5A:
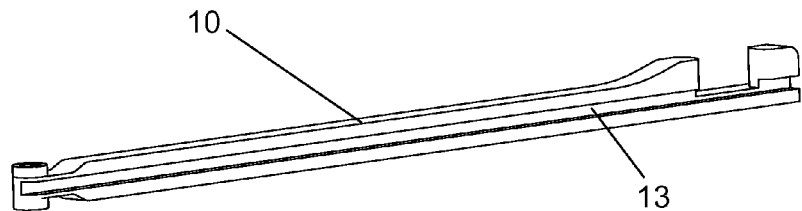
FIG. 5A is an isometric view from one side of one of the sliding elements forming part of the mask of FIGS. 1 to 4.
Figure 5B:
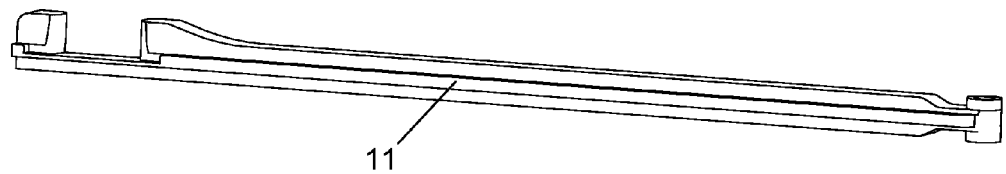
FIG. 5B is an isometric view from the other side of the sliding element shown in FIG. 5A.
Figure 6:
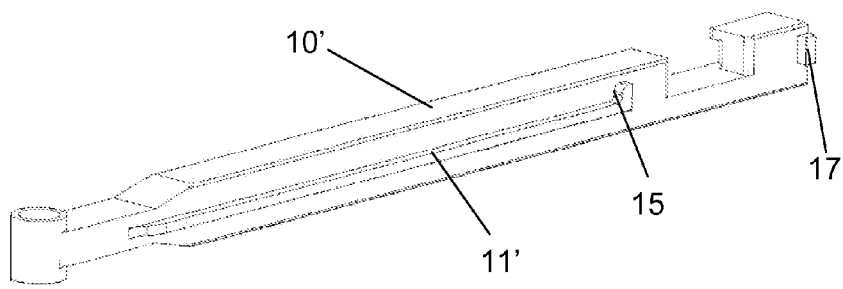
FIG. 6 is an isometric view showing a sliding element having an alternative configuration.

The manner in which the profile formers 10 interlock is more readily apparent from FIGS. 5A and 5B which show two opposite sides of an individual profile former 10. Each profile former 10 is provided on one side with a ridge or tongue 11 running along one side and a groove 13 extending along the other side. The profile formers 10 interlock by virtue of the tongue 11 of one profile former residing in the groove 13 of a neighbouring profile former.

FIG. 6 shows a profile former 10' having a slightly different configuration. In this embodiment, a stop 15 is provided at one end of the tongue 11' which limits the extent of forward movement of the tongue 11' in the groove (not shown) of a neighbouring profile former to about 5 mm. A second stop 17 limits movement of the profile former 10' in the reverse direction.

Figure 7:
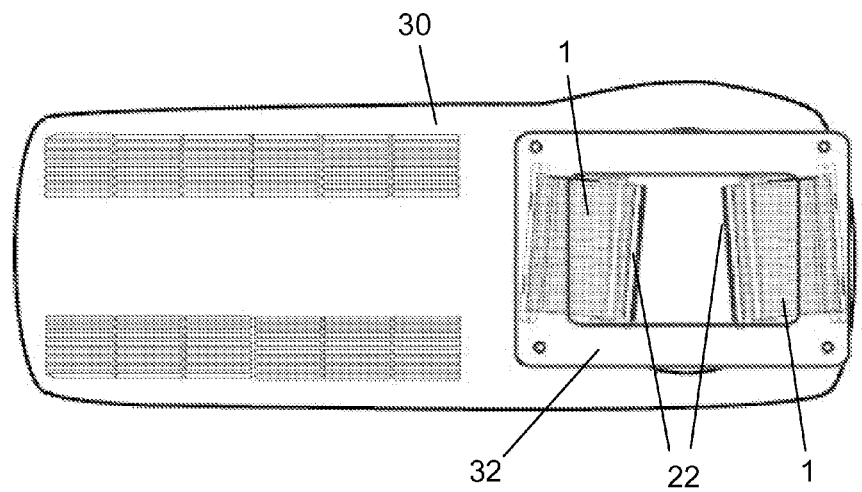
FIG. 7 is a front view showing a pair of optical masks of the type illustrated in FIGS. 1 to 6 mounted on a projector.
Figure 8:
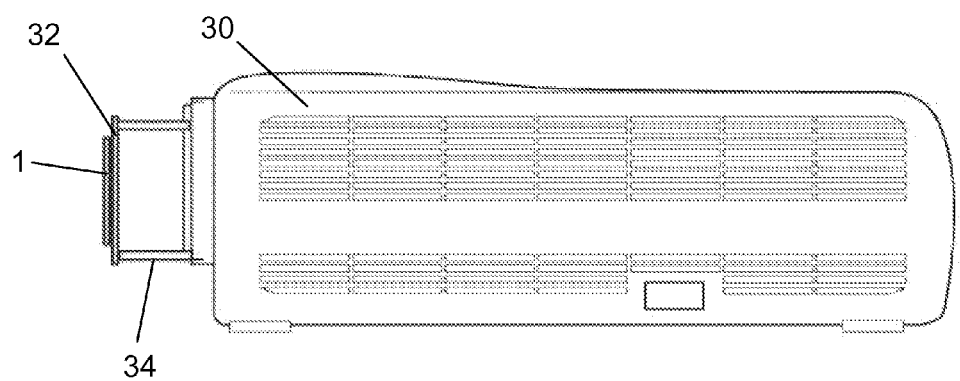
FIG. 8 is a side view of the projector and optical mask assembly of FIG. 7

A projection system for forming a large scale image, such as an image on the dome of a planetarium or other immersive cinema structure, will typically comprise a plurality of projectors each provided with two or more optical blending masks as illustrated in FIGS. 7 and 8. As shown in FIGS. 7 and 8, a projector 30 has a support frame 32 mounted in front of the lens by means of mounting rods 34. A pair of optical masks 1 of the invention are secured to the frame, one on either side of the opening by means of bolts or screw through the mounting tabs 5 on the mask. The masks 1 are shown as being mounted on the support frame 32 at an angle. The angle may be adjusted by means of bespoke slots and mounting points located on the support frame 32.

Images from several projectors are projected through the blending masks on to the dome so that they overlap. The optical blending masks are then configured by adjusting the profiles of the combs 22 as described above to blend the images in the regions of overlap. The result is that the overall appearance on the dome is of a single continuous image.

Once the profiles of the combs have been optimised, they may be fixed in position to prevent inadvertent dislodgement. For example, the retaining bar 8 may be provided with clamping screws or bolts (not shown) so that the bar can be tightened down onto the profile formers.

Thereafter, the profiles of the combs may be altered as required simply by unscrewing the clamping screws or bolts.

Figure 11:
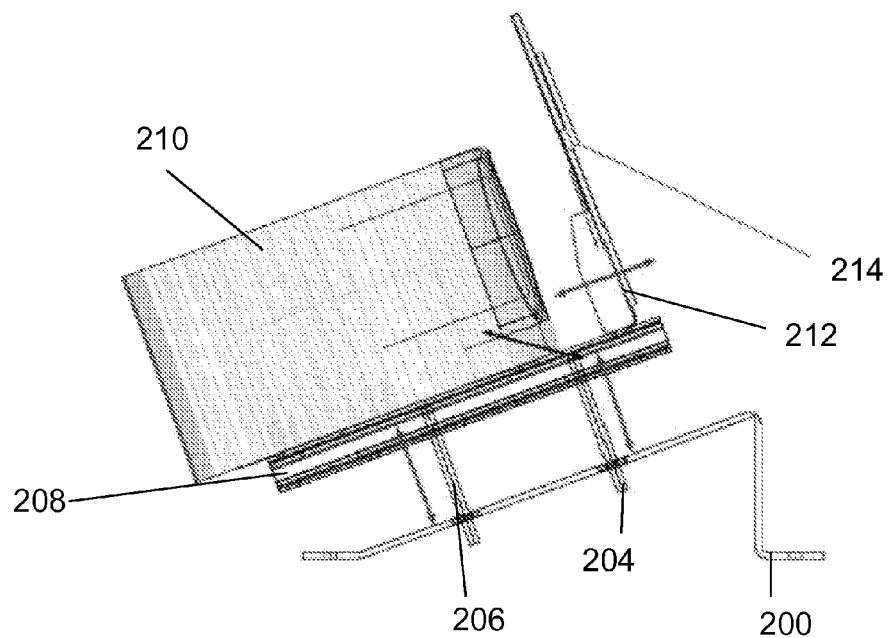
FIG. 11 is a side view of a projector support carrying an optical mask assembly according to the present invention.
Figure 12:
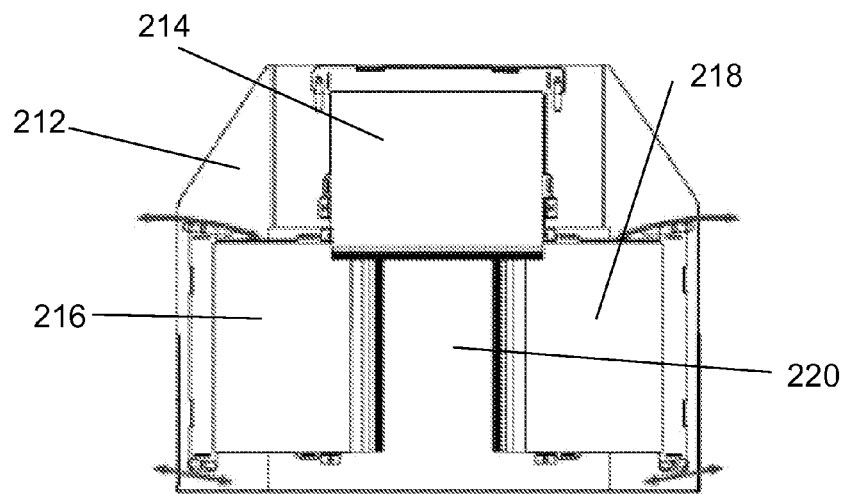
FIG. 12 is an enlarged view, facing forward away from the projector, of the projector support and optical mask assembly of FIG. 10.
Figure 16:
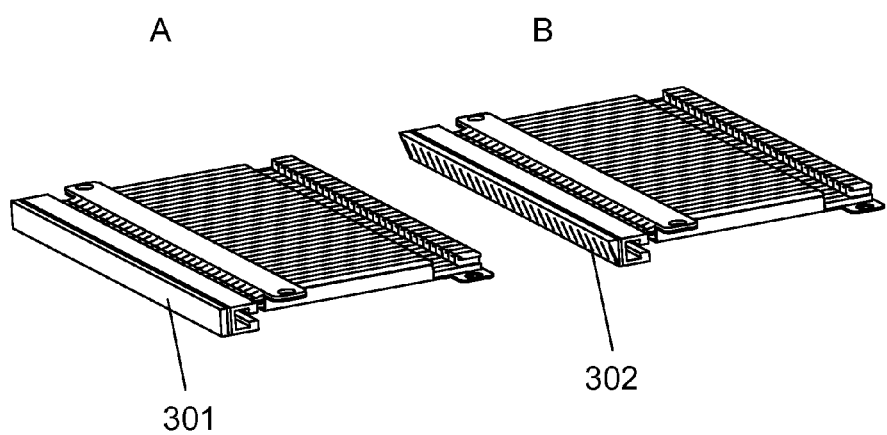
FIGS. 16A and 16B are isometric views of assemblies of elongate sliding elements carrying alternative forms of transmission-modifying edge.

An alternative mounting arrangement for a projector and optical mask assembly forming part of a projection system of the invention is shown in FIGS. 11 and 12. As shown in FIG. 12, the mounting arrangement comprises a base plate 200 which is wedge-shaped in profile. Attached to the base plate 200 are two pairs of threaded shafts 204, 206 which are anchored in a mounting platform 208 for the projector 210. The two threaded shafts 204, 206 may be rotated to vary the height and angle of the mounting platform 208.

Secured to the mounting platform 208 is a mounting frame 212 to which are attached optical masks 214, 216 and 218. The mounting frame 212 is slidably mounted on the mounting platform 208 by virtue of sliding bolts (not shown) on the base of the mounting frame which slide along slots (not shown) in the mounting platform 208. In this way, the distance between the mounting frame 212 and the projector 210 may be varied. In the embodiment shown in FIG. 12, the mounting frame has three optical masks 214, 216, 218 attached to it. The mounting frame and optical masks are each provided with various slots, sliding bolts and pivot points (not shown) so that each of the masks can be moved in or out relative to the aperture 220 in the mounting frame and/or can be rotated to vary the angle of the mask relative to the aperture. Thus, in addition to the variability of the profile of each mask, the projector and optical mask assembly of FIGS. 11 and 12 is provided with a wide range of further degrees of adjustment to enable the optical masks to be set up to provide the required blending of overlapping images.

FIGS. 13 to 15 illustrate alternative mask configurations. In FIG. 13, a pair of masks is set up in an opposed configuration and in FIGS. 14 and 15, three and four masks respectively are used.

Figure 9:
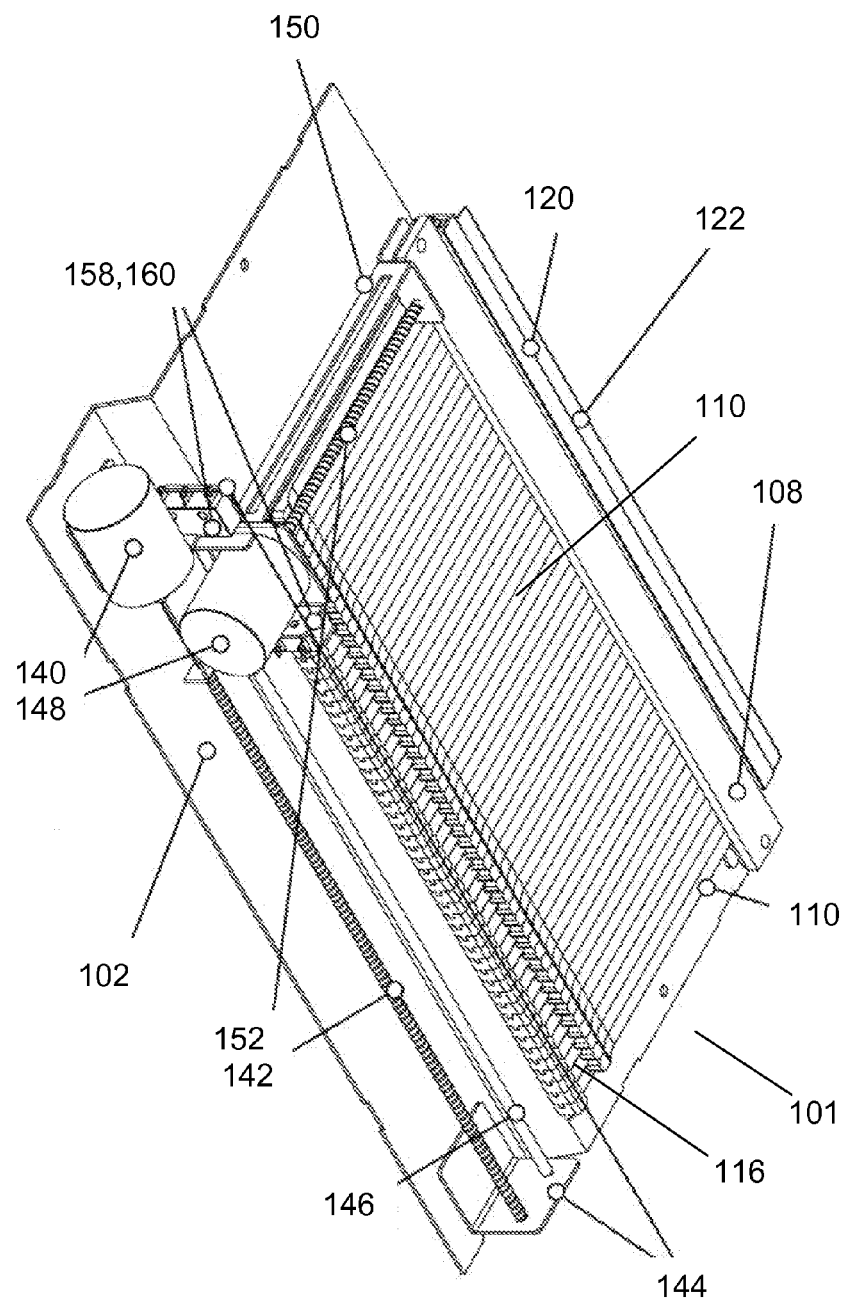
FIG. 9 is an isometric view of an optical mask according to a second embodiment of the invention.
Figure 10:
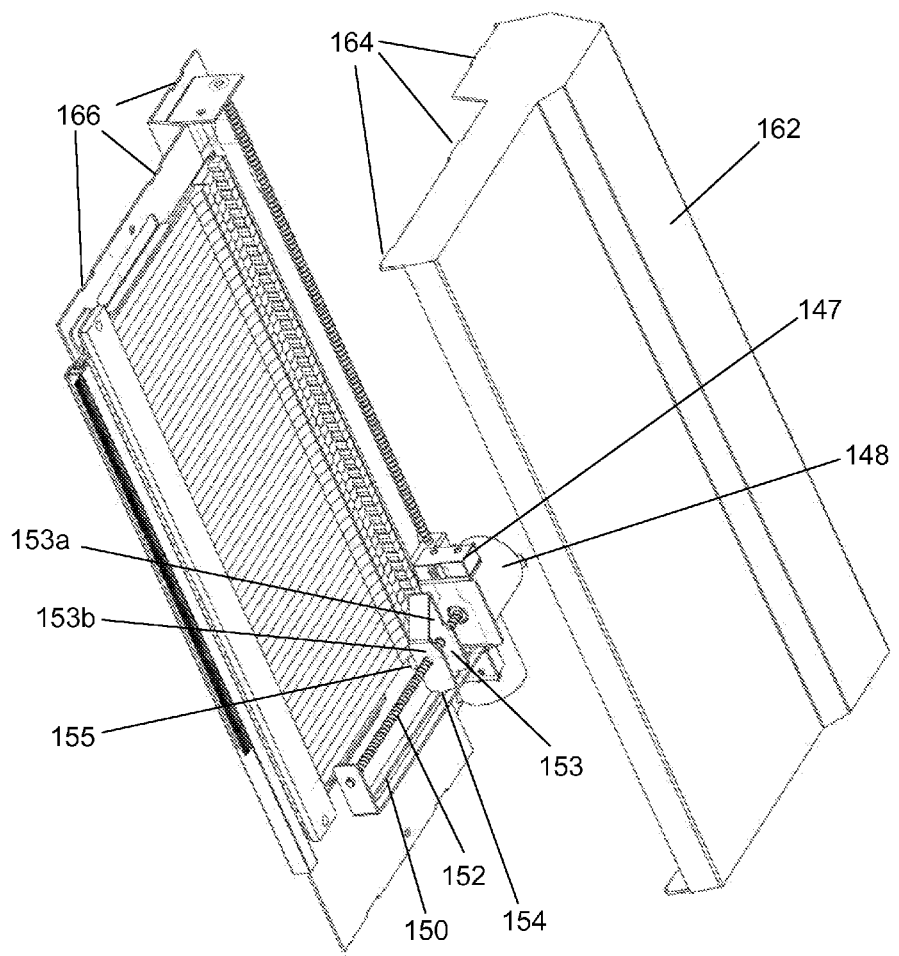
FIG. 10 is another isometric view of the optical mask of FIG. 9 but with a covering member shown.

The blending mask arrangements illustrated in FIGS. 1 to 8, 11 and 12 can be adjusted manually by a trained technician to achieve the desired blending of overlapping images. However, as an alternative, mechanical, electrical or electromechanical means may be provided for moving the profile formers and thus altering the profile of the comb. FIGS. 9 and 10 illustrate a blending mask provided with an electromechanical actuating mechanism for moving the profile formers.

Thus, as with the optical blending mask of FIGS. 1 to 8, the optical blending mask of FIGS. 9 and 10 comprises a base plate 102 on which is mounted an array of interlocked independently slidable profile formers 110, the construction of which is substantially the same as the profile formers shown in FIGS. 1 to 6. The profile formers 110 are held in place by the retaining bar 108. As with the array of profile formers in FIGS. 1 to 4, the profile formers of FIGS. 9 and 10 are configured so that, collectively, they form a shallow channel 116. A comb 122 and profile substrate 120 are secured to the ends of the profile formers 110 in the same manner as shown in FIGS. 1 to 6.

In contrast to the mask shown in FIGS. 1 to 6, the mask of FIGS. 9 and 10 has an enlarged base plate 102 on which is mounted an electromechanical actuator. The electromechanical actuator comprises an axis motor 140 (the x-axis motor), which is secured to the base plate 102, a lead or drive screw 142 (the x-axis lead screw) and a guide rail 146 (the x-axis guide rail) mounted on the x-axis guide rail bracket 144. The lead screw 142 and guide rail 146 are mounted on the bracket 144 at the end distal with respect to the axis motor.

Mounted on the lead screw 142 and guide rail 146 is a carriage 147 which carries a second motor 148 (the y-axis motor) and a slotted guide rail 150. The y-axis motor drives y-axis lead screw 152. Mounted on the y-axis lead screw is a second carriage 153 (the y-axis carriage) which tracks along the slotted guide rail 150 by virtue of a tongue 154 which engages the slot in the guide rail 150. The y-axis carriage carries a wheel 155 mounted on an axle extending between the two walls 153a and 153b, A lower part of the wheel 155 can be seen in FIG. 10. Rotation of the drive screw 142 causes the wheel to move along the shallow channel 116 formed by the profile formers 110.

In order to conceal and protect the electromechanical actuator and the profile formers, a cover 162 is provided. Cover 162 can be secured to the base 102 by a friction fit between tabs 164 on the cover and recesses 166 and/or by means of fastening elements (not shown) such as screws.

The principles of operation of the optical blending mask of FIGS. 9 and 10 are the same as the principles of operation of the mask of FIGS. 1 to 6, except that the adjustment of the profiles of the combs 122 can be carried out using the y-axis and y-axis motors to move the profile formers rather than moving them manually.

Thus, activation of the x-axis motor 140 will rotate the x-axis lead screw 142 to move the carriage 146 along the x-axis guide rail 144 and the wheel 155 on the carriage 153 along the channel 116. Activation of the y-axis motor 148 will rotate the y-axis lead screw 152 to move the carriage 153. As the carriage 153 moves, the wheel 155 is urged against the walls of the channel 116 in a profile former to move the profile former forwards or backwards along its axis depending on the direction of rotation of the lead screw 152.

The motors 140 and 148 may be activated in such a way that the positions of individual profile formers are adjusted one by one in successive discrete steps. Alternatively, the electronics controlling the motors may be arranged to adjust the positions in a smooth continuous sweep along the x-axis.

Logic switches 158 and 160 linked to the control electronics indicate when the carriages are in the x=0 and y=0 "home" positions. The distances moved by the carriages 147 and 153 away from the home positions, whether in successive discrete steps or in a smooth continuous sweep, can then be determined from the numbers of rotations of the lead screws and the pitches of the lead screws.

In the embodiment illustrated, the carriage 153 is provided with a wheel that tracks along the channel 116 in the array of profile formers. The use of a wheel facilitates smooth movement along the channel, there being no edges to snag against the edges of the individual profile formers. As an alternative to a wheel, a smooth rounded peg could be mounted on the carriage 153 so as to track along the channel 116 and provide a means for moving the profile formers forwards or backwards.

The electronic controls (not shown) may be mounted on, or form part of, the optical blending mask assembly itself, or they can be contained within a control device (such as control console or computer) which would either be hard wired to the blending mask assembly or linked by cable or wireless connection to the assembly. In this way, technicians setting up the projector systems in an auditorium or other venue can adjust the optical blending masks remotely whilst viewing the results of the adjustments from an optimal viewing position in the auditorium.

In the embodiments of FIGS. 1 to 15, the edge-forming elements making up the comb are attached as a continuous strip to a silicone profile substrate which is a unitary entity attached to the ends of the profile formers. However, in an alternative arrangement, the silicone profile substrate can be omitted and the ends of the profile formers may have edge-forming elements directly attached thereto. The edge-forming elements may be made separately and then attached to the ends of the profile formers or they may be integrally moulded with the profile formers. Each profile former may bear one or several edge-forming elements. For example, each profile may have one, two or three edge-forming elements (such as teeth). Where the edge-forming elements are mounted directly on the profile formers rather than an intermediate profile substrate, the ends of the profile formers may be illuminated by the beam of light from the projector. The fact that the profile formers interlock with each other prevents light from passing between them and ensures that stray light is not projected onto the image.

FIGS. 16A and 16B illustrate alternative forms of transmission-modifying edge. In FIG. 16A, the edge 301 is formed as a smooth continuous strip of a flexible plastics or metal material. In FIG. 16B, the edge 302 is formed from a relatively rigid polymer extrusion (e.g. a polyethylene extrusion of, for example, a thickness of less than 2 mm) which is scored to aid in curve forming.

The optical blending masks of the invention provide a number of significant advantages over known blending masks.

Firstly, they are adjustable, which means that the profiles can be altered as necessary to compensate for irregularities in the surface on which the images are to be projected.

Secondly, if the profiles change after installation, for example because of mechanical interference by customers or other personnel in an auditorium, or because of creep (e.g. thermally induced creep) of the materials from which the masks are formed, they can readily be restored to the required settings.

Thirdly, testing carried out on systems comprising the optical mask assemblies of the invention has shown that they exhibit improved stability.

Fourthly, projection systems comprising the optical mask assemblies of the invention can be remotely and/or centrally controlled which is a considerable advantage as the users would be blending from the centre of the dome (the design eye point) rather than the peripheral areas (where the user's view is offset and therefore not optimal). In existing systems, two engineers would typically be required to set up the projectors to create the required blended images, one engineer being located at the design eye point and the second at the projection channel. In such an arrangement, the second engineer would adjust the blends based on the first engineer's instructions. Although this would still be the case with a manual version of the present invention, the motorised version of the apparatus as illustrated in FIGS. 9 and 10 would allow the blending to be carried out by a single engineer located at a central point in the dome. Such an arrangement would enhance ease of use and would require fewer engineers to operate it.

Alternatively a camera mounted at or close to the design eye point could relay the view of the display to the engineer. This would permit the engineer to be located in an entirely remote location thereby reducing the running costs and down time by removing the need for the engineer to travel to the site. In a further alternative, output from the camera could be processed by a computer programmed to control the optical mask, thereby fully automating the adjustment of the system.
Equivalents It will readily be apparent that numerous modifications and alterations may be made to the specific embodiments of the invention described above without departing from the principles underlying the invention. All such modifications and alterations are intended to be embraced by this application.

The invention claimed is:

1. An optical mask for use in blending overlapping tiled images, the optical mask comprising a support; an array of elongate sliding elements arranged side by side on the support, each sliding element being independently movable along an axis and being constrained against lateral translational movement; the mask having a transmission-modifying edge for positioning in a beam of light to modify transmission of the light, the transmission-modifying edge being formed separately from the elongate sliding elements and having a profile which is adjustable by moving one or more of the sliding elements along their axes.

2. The optical mask according to claim 1 wherein the transmission-modifying edge is a composite edge formed from a plurality of adjoining edges.

3. The optical mask according to claim 2 wherein the composite edge comprises a row of edge-forming elements, the row extending transversely with respect to the elongate sliding elements.

4. The optical mask according to claim 3 wherein the composite edge is formed as a comb element.

5. The optical mask according to claim 1 wherein the transmission-modifying edge is a continuous edge.

6. The optical mask according to claim 1 wherein the elongate sliding elements overlap in a lateral direction.

7. The optical mask according to claim 6 wherein adjacent elongate sliding elements overlap by means of interlocking formations on mutually abutting sides thereof.

8. The optical mask according to claim 1 wherein a movement-transmitting element is positioned between the elongate sliding elements and the transmission-modifying edge, the movement-transmitting element serving in use to transmit movement of the elongate sliding elements to the transmission-modifying edge so as to form a desired profile.

9. The optical mask according to claim 8 wherein the movement-transmitting element is resiliently deformable.

10. The optical mask according to claim 9 wherein the movement-transmitting element is formed from an elastomeric material.

11. The optical mask according to claim 1 wherein adjacent pairs of sliding elements are provided with movement limiting means which limit the distance that one sliding element can slide with respect to the other.

12. The optical mask according to claim 11 wherein each of the sliding elements is provided with a movement limiting means to limit the distance that the sliding element can slide with respect to its adjacent sliding element.

13. The optical mask according to claim 1 wherein means are provided for locking the elongate sliding elements against unwanted movement.

14. The optical mask according to claim 13 wherein the locking means are releasable.

15. The optical mask according to claim 1 comprising an actuator device for moving the elongate sliding elements along their axes.

16. The optical mask according to claim 15 wherein the actuator device is an electromechanical actuator device.

17. The optical mask according to claim 16 wherein the actuator device comprises a first motor-driven carriage movable transversely with respect to the array of elongate sliding elements; a second motor-driven carriage linked to the first motor-driven carriage and movable axially with respect to the elongate sliding elements, the second carriage being provided with means for engaging the elongate sliding elements and moving them in an axial direction; and a controller for controlling the transverse and axial movements of the carriages.

18. The optical mask according to claim 17 wherein the means for engaging the elongate sliding elements is configured so as to be able to move each elongate element individually.

19. A projection system comprising a projector mounted on a mounting platform, and an optical mask assembly comprising two or more optical masks as defined in claim 1 mounted on a mounting structure.

20. A method of blending overlapping images from a plurality of projectors, which method comprises placing in a light beam formed by each projector the optical mask as defined in claim 1 and adjusting the profiles of the transmission-modifying elements to control the amount of light transmitted past the transmission-modifying elements.

* * * * *